United States Patent [19]

Yamaguchi

[11] Patent Number: 5,371,583
[45] Date of Patent: Dec. 6, 1994

[54] ROLLER BREAKAGE DETECTOR FOR ROLLER HEARTH KILNS

[75] Inventor: Minoru Yamaguchi, Ichinomiya, Japan

[73] Assignee: NGK Insulators, Ltd., Nagoya, Japan

[21] Appl. No.: 995,880

[22] Filed: Dec. 23, 1992

[30] Foreign Application Priority Data

Dec. 24, 1991 [JP] Japan .................. 3-341094

[51] Int. Cl.$^5$ .................. G01N 21/88; G01V 9/04
[52] U.S. Cl. .................. 356/237; 250/222.1
[58] Field of Search .................. 356/237; 250/223 R, 250/222.1

[56] References Cited

U.S. PATENT DOCUMENTS

| | | | |
|---|---|---|---|
| 2,613,933 | 10/1952 | Johns et al. | 250/222.1 X |
| 3,604,940 | 9/1971 | Matthews | 250/222.1 X |
| 5,015,840 | 5/1991 | Blau | 250/222.1 X |
| 5,065,009 | 11/1991 | Aoki | 250/222.1 |

FOREIGN PATENT DOCUMENTS 4-227468  8/1992  Japan .

Primary Examiner—Vincent P. McGraw
Attorney, Agent, or Firm—Adduci, Mastriani, Schaumberg & Schill

[57] ABSTRACT

Light projectors are located outside of a kiln inlet and at positions below the axis of a roller array for generating optical signals in the lengthwise direction. Light receptors are located outside of a kiln outlet and at positions below the axis of a roller array for independently receiving the optical signals from the projectors. When the rollers rotate normally, the light generated from the projectors enter intermediately the receptors. When there is roller breakage, the broken roller falls due to gravity and tilts down. Then, a part of the light generated from the projectors is cut off by the broken roller piece. Hence, no ray reaches the receptor corresponding to the shielded ray. This ensures that roller breakage is detected.

8 Claims, 3 Drawing Sheets

ROLLER BREAKAGE DETECTOR FOR ROLLER HEARTH KILNS

BACKGROUND OF THE INVENTION

The present invention relates generally to a roller hearth kiln for firing material while it is being carried and more specifically to a system for detecting roller breakage or failure in a roller hearth kiln.

A roller hearth kiln so far used for firing ceramic material into compact, light-weight ceramic products such as tiles includes a tunnel form of kiln body formed of such materials as refractory brick or ceramic fibers. Within this kiln body, there are an array of rollers for carrying the material to be fired in the lengthwise direction, which are discretely arranged across the kiln body. These rollers are driven for rotation by a driving means located outside of a kiln casing.

Such a roller hearth kiln, when a roller or rollers therein fail or break down, has some difficulty in smoothly carrying the material being treated, because the broken roller or rollers form or forms a barrier. It is then required to detect such roller breakage promptly, thereby replacing the broken rollers by new ones. A conventional roller breakage detector such as one known from JP-B-56-14951 is designed such that, when some rollers break down, the overall roll array is axially moved by means of springs and this is detected by a proximity detector. Another sensor system that is known from JP-A-3-87592 includes an arrangement of semi-circular light shielding members mounted at the driven side ends of rollers. These light shielding members rotate in unison in normal roller operation, but they do not rotate in unison when the rollers do not operate normally. This is detected by light receptors and projectors.

A problem with the conventional system shown in JP-B-56-14951, however, is that the structure for supporting the rollers is complicated due to the provision of such means as metal sheets or springs at the driven ends of the rollers, thus needing special care as to how to support the rollers.

The prior art system set forth in JP-A-3-87592 also offers a problem. As illustrated in FIG. 4 as an example, when there is a failure of a roller that rotates at the position shown in FIG. 4A in normal operation, a roller piece 5a tilts down, as illustrated in FIG. 4B. Then, this roller failure cannot be detected by a photoelectric switch 20; in other words, light cannot normally be cut off. Another problem is that, as shown in FIG. 4C, much time and labor are needed for regulating semi-circular light shielding members mounted at the driven ends of several tens' rollers of a few hundred rollers 15 to the same angle of rotation.

In view of overcoming these problems, an object of the invention is to provide a roller breakage detector system used with a roller hearth kiln, which ensures to detect some roller breakage or failure with simple equipment but with no need of any special care as to how to support the rollers.

SUMMARY OF THE INVENTION

According to the invention, the object mentioned above is achieved by the provision of a roller breakage detector system used with a roller hearth kiln, in the kiln body of which an array of rollers are arranged in the lengthwise direction to fire material while it is being carried, a light projector located at a position below the axis of said roller array in the lengthwise direction for generating at least an optical signal in the lengthwise direction, and a light receptor located at a position below the axis of said roller array in the lengthwise direction for receiving the optical signal generated from said light projector. The roller breakage detector system may include the optical signals generated from said light projector, which include both optical signals that propagate from an inlet side to an outlet side of said kiln body and optical signals that propagate from the outlet side to the inlet side of said kiln body.

As illustrated in FIG. 8 as an example, the direction of propagation of the optical signals lies from the kiln inlet to kiln outlet and vice versa.

When the rollers rotate normally, the rays emitted by the projectors enter immediately the receptors. Then, the receptors output signals, indicating that the rollers rotate normally.

When there is roller breakage, as typically shown in FIG. 3, the roller falls due to gravity and tilts down. Then, a part of the rays generated by the projectors is cut off by the broken roller piece. This ensures to detect the roller breakage, because the rays do not enter the associated receptor.

BRIEF DESCRIPTION OF THE DRAWINGS

The invention will now be explained, by way of example but not by way of limitation, with reference to the accompanying drawings, in which.

EXPLANATION OF THE PREFERRED EMBODIMENTS

Figure 1:
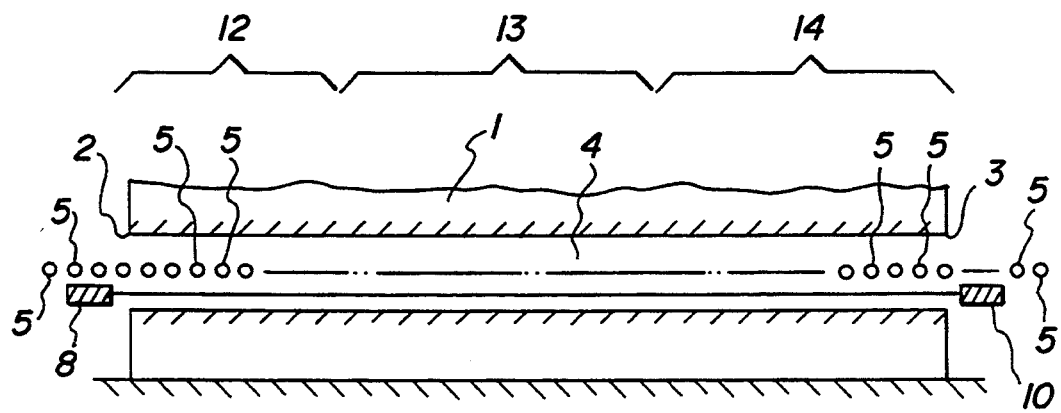
FIG. 1 provides a schematic, longitudinally sectioned representation of one embodiment of the roller hearth kiln according to the invention, FIG. 2 provides a schematic, plan representation of one embodiment of the roller hearth kiln according to the invention, FIG. 3 provides a general illustration of how a roller breaks down, FIGS. 4a-c provides an illustrative representation of a roller that rotates normally and breaks down in a conventional arrangement, FIG. 5 provides a schematic representation of a second embodiment according to the invention, FIG. 6 provides a schematic representation of a third embodiment according to the invention, FIG. 7 provides a schematic representation of a fourth embodiment according to the invention, and FIG. 8 provides a schematic representation of a further embodiment according to the invention.
Figure 2:
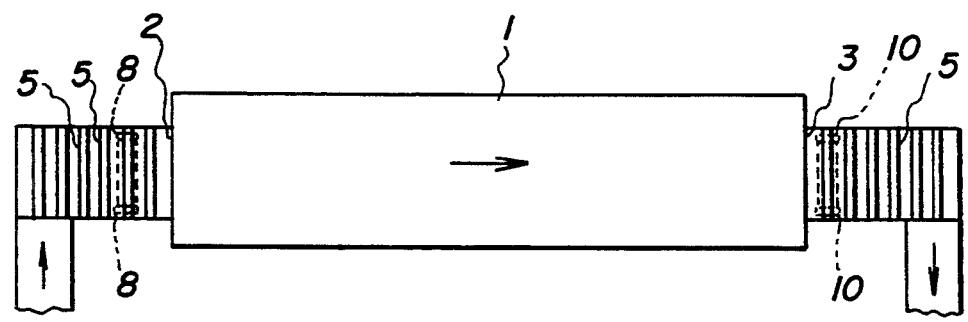

Referring now to FIGS. 1 and 2, there is shown a roller hearth kiln built up of a kiln body 1 that includes a tunnel form of carrying passage 4 through which the feeds to be fired are carried in the lengthwise direction. At one end of the passage 4 there is provided a kiln inlet 2, and at the other end a kiln outlet 3. Outside of the kiln inlet 2 there are provided a number of rollers 5 at given intervals, and outside of the kiln outlet 3 there are again a number of rollers 5 at given intervals. Within the carrying passage 4 there are arranged a number of hollow pipe rollers 5 of ceramic material at given intervals and in the lengthwise direction. These rollers extend at the driving ends from the roller side walls, and sprockets, although not illustrated, are fixed to the driving ends. The rollers 5 are driven in phase by means of a chain supported as by sprockets. The other or driven ends of the rollers 5 are each supported by a pair of supporting rollers (not shown), so that the respective rollers 5 can rotate.

A given number of or, for instance, 10, light projectors 8 that generate laser light are located at positions slightly below the positions of the rollers in the vicinity of the kiln inlet 2 and in the widthwise direction. Ten (10) light receptors 10, which are associated with the projectors 8 and receive light in one-match-one relation, are located at positions lying at the kiln outlet 3 and slightly below the positions of the rollers 5 in the vicinity of the kiln outlet 3. Again, these light receptors 10 are provided outside of the kiln outlet 3.

As mentioned above, the projectors 8 and receptors 10 are provided outside of the kiln inlet 2 and outlet 3, respectively. According to the invention, projectors and receptors may be provided at a low-temperature zone in the kiln. This is because it is not only difficult to predict which roller 5 in the kiln breaks down in the lengthwise direction but it is also required to monitor all the rollers 5 as to whether or not they are breaking down. Much difficulty is also involved in predicting how a roller, if breaks down, drops and which ray is cut off in the widthwise direction, depending on what state the broken roller piece tilts down in. This is the reason a plurality of projectors 8 and a plurality of receptors 10 are provided in the widthwise direction. Thus, since at least one ray can be cut off irrespective of in what state the broken roller piece tilts down, it is assured that any roller breakage can be detected.

The instant embodiment works as follows. The rollers 5 are chain-driven and thereby rotated in phase. This in turn enables the feeds (to be fired) to be carried from the kiln inlet 2 to the kiln outlet 3. The feeds are pre-heated through a pre-heating zone 12, then fired through a firing zone 13, then cooled through a cooling zone 14 and finally discharged through the kiln outlet 3 as products.

When the rollers 5 rotate normally, the laser light beams emitted by the projectors 8 go straightforward under the rollers 5 arranged on the carrying passage 4 in the lengthwise direction, and enter the associated receptors 10 located at the outlet 3 in one-match-one relation.

Figure 3:
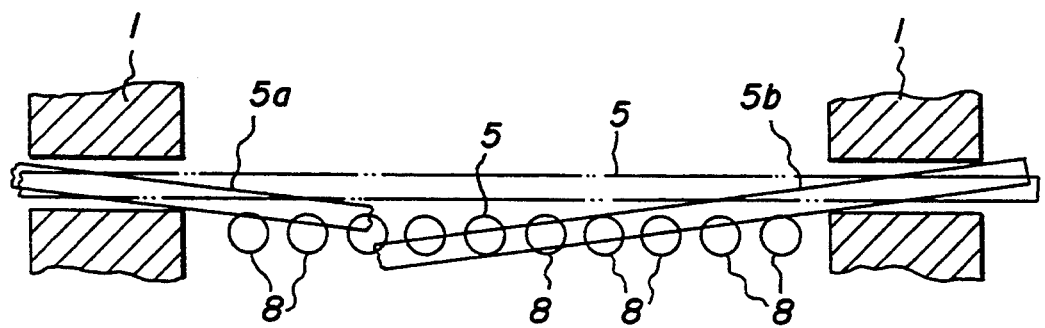
Figure 4A:
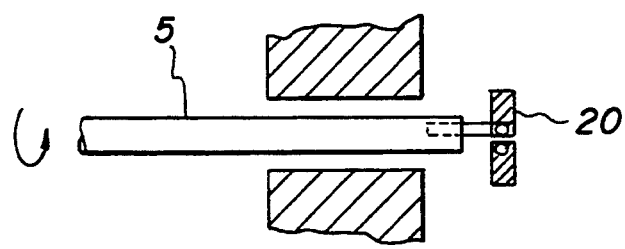
Figure 4B:
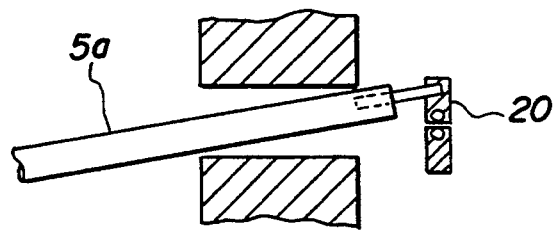
Figure 4C:
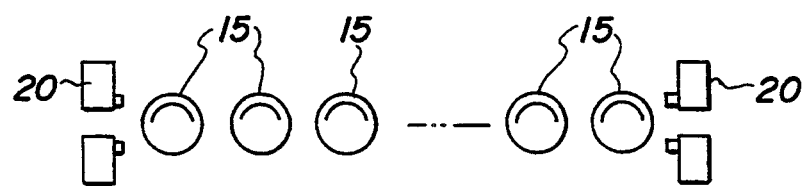

When at least one of a number of rollers 5 breaks down, the roller such as one shown in FIG. 3 is cut into broken roller pieces 5a and 5b, which then fall due to gravity and tilt down, so that a part of the laser light emitted by the projectors 8 can be cut off by the roller piece 5b. Hence, the receptor 10 corresponding to the cut-off laser light beam receives no laser light beam, so that the roller breakage can be detected by a control device for receiving signals from the receptor 10. In the foregoing embodiment, the projectors 8 are provided outside of the kiln inlet 2 and the receptors 10 are provided outside of the kiln outlet 3. In the invention, however, it is noted that this arrangement may be reversed; in other words, either the projectors 8 or receptors 10 may be located outside of the kiln inlet 2, and the other outside of the kiln outlet 3. In the invention, no critical limitation is placed on the number of projectors and receptors, while the first embodiment uses 10 per each. Preferably, the projectors 8 and receptors 10 are positioned below the central axis of the rollers 5 by a given distance. It is again preferable that the projectors 8 are positioned slightly upstream of the kiln inlet 2, as viewed in the lengthwise direction. This is because the further the projectors 8 are away from the kiln inlet 2, the more safely and conveniently can the detector system be used in view of the heat resistance of the light emitter and maintaining and checking up laser light. Another reason is that if the projectors 8 are located at such positions, the feeds to be fired can then be more smoothly carried through the roller hearth kiln. With respect to where the receptors 10 are to be located, it is preferable that they are located at positions further away from the kiln outlet 3. This may be determined while taking the heat resistance of the receptors into account, and enables the thermally treated feeds to be more smoothly discharged from within the kiln and the receptors 10 to be maintained and checked up more easily as well. The present invention wherein the projectors and receptors are provided at positions lying outside of the kiln, at which they are less likely to be affected by the heat prevailing in the kiln, gives a higher reliability to the roller breakage detector system.

In this connection, it is understood that the projectors and receptors may be located within the roller hearth kiln. This is because where rollers are likely to break down lies at a high temperature zone, as viewed in the lengthwise direction, and this high-temperature zone is located at the central region of the kiln.

Figure 5:
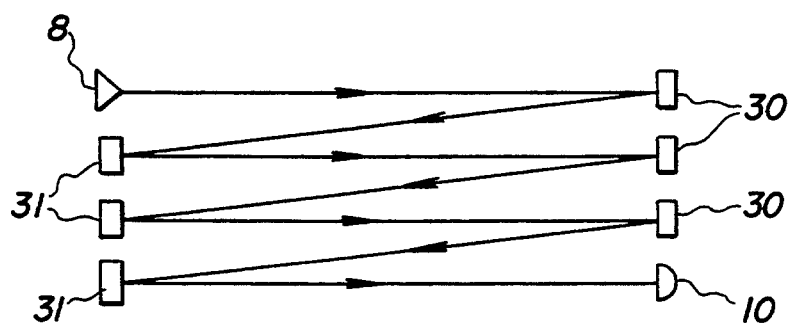

The second embodiment of the invention is illustrated in FIG. 5.

In the second embodiment shown in FIG. 5, the roller hearth kiln is provided therein with a projector 8 and reflective means 31 at one end in the lengthwise direction and reflective means 30 and a light receptor 10 at the other end. Optical signals sent out of the projectors 8 go straightforward, are reflected over and over between a plurality of reflective means 30 and 31, and reach the light receptor 10. Light reaching the receptor 10 indicates that the rollers are in good condition.

When there is roller breakage, light is cut off by the broken roller, so that the light cannot reach the receptor 10, indicating the occurrence of roller breakage.

Figure 6:
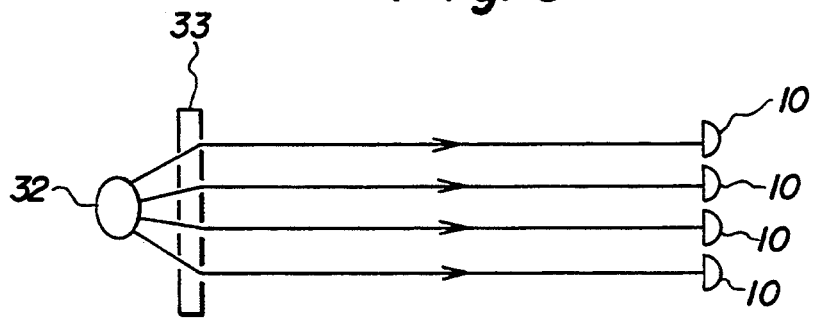

The third embodiment of the invention is illustrated in FIG. 6.

In the third embodiment shown in FIG. 6, light emitted from a single light source 32 is converted by refracting means 33 to optical signals propagating in four parallel, lengthwise directions, which are then independently received by four light receptors 10. While the rollers rotate normally, all the receptors 10 receive optical signals normally. When there is roller breakage, optical signals are cut off by the broken roll, so that any one of the four receptors 10 cannot receive the optical signals. This indicates that roller breakage has occurred.

Figure 7:
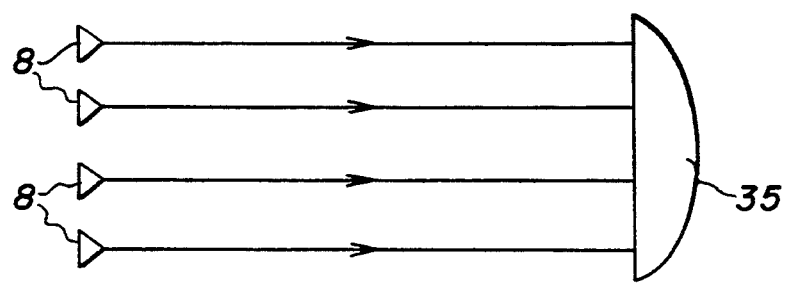
Figure 8:
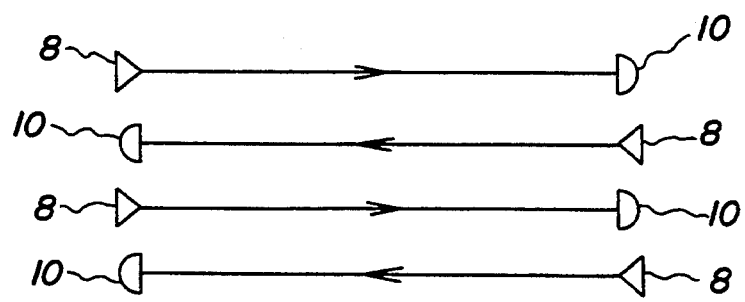

The fourth embodiment of the invention is illustrated in FIG. 7.

In the fourth embodiment shown in FIG. 7, optical signals emitted by four projectors 8 in the lengthwise direction are received by a single light receptor 35. When at least one of the rollers breaks down, at least one of the optical signals is cut off by the broken roll, so that there can be a decrease in the quantity of light received by the receptor 35. This indicates that roller breakage has occurred.

While all the embodiments use laser light excellent in linearity, it is understood that other rays such as infrared rays or visible rays may be used for the same purpose. Alternatively, light emitted from a light source located outside of the kiln is guided into the kiln by suitable means such as prisms and reflectors.

I claim:

1. A roller breakage detector system for use with a roller hearth kiln, in the kiln body of which an array of rollers are arranged in the lengthwise direction to fire material while the material is being carried, comprising:

a light projector located at a position below an axis of said roller array in the lengthwise direction for generating at least one optical signal in the lengthwise direction, and a light receptor located at a position below the axis of said roller array in the lengthwise direction for receiving the optical signal generated from said light projector.

2. A roller breakage detector system as claimed in claim 1, wherein the optical signal generated from said light projector include an optical signal that is propagated from an inlet side to an outlet side of said kiln body and an optical signal that is propagated from the outlet side to the inlet side of said kiln body.

3. A roller breakage detector system as claimed in claim 1, which further includes reflective means for propagating the optical signal from one lengthwise direction to an opposite lengthwise direction, thereby reciprocating the optical signal through the roller hearth kiln.

4. A roller breakage detector system as claimed in claim 1, wherein said projector is a single light source and an optical splitter means for splitting light from said light source into a plurality of beams of light.

5. A roller breakage detector system as claimed in claim 1, wherein said optical signal is laser light.

6. A roller breakage detector system as claimed in claim 1, wherein the optical signal propagated from said projector to said receptor includes an optical signal propagated in one lengthwise direction and an optical signal propagated in an opposite lengthwise direction.

7. A roller breakage detector system used with a roller hearth kiln, in the kiln body of which an array of rollers are arranged in a lengthwise direction so as to fire material while the material is being carried, comprising:

a plurality of light projectors for generating optical signals located outside said kiln body and at positions below an axial line of said roller array, and a plurality of light receptors located opposite to said light projectors and externally of an inlet and outlet of said kiln and at positions below the axial line of said roller array, said plurality of light receptors independently receiving the optical signals generated by said respective light projectors.

8. A roller breakage detector system for use with a roller hearth kiln, in the kiln body of which an array of rollers are arranged in a lengthwise direction to fire material while the material is being carried, a light projector located at one end of the kiln in the lengthwise direction and at a position below the axis of said roller array in the lengthwise direction for generating an optical signal in the lengthwise direction, a light receptor located at the other end of the kiln in the lengthwise direction and at a position below the axis of said roller array in the lengthwise direction for receiving the optical signal generated by said light projector, and discriminator means for discriminating whether roller breakage a decrease in light quantity received by said receptor.

* * * * *